No. 704,168. Patented July 8, 1902.
F. E. ANDERSON.
MEANS FOR CASHING SALES ACCOUNTS.
(Application filed Nov. 29, 1901.)
(No Model.) 4 Sheets—Sheet 1.

Fig. 2.

SERIES S  N° 2224    New York Nov. 1st 1901.

Messrs John S.... & Co.
1000 Broad St. Philadelphia Pa.

BOUGHT OF A. B. WOOLEN CO.
MANUFACTURERS & MERCHANTS,
*C*
4000 BROADWAY.

VIA Penn R.R.    TERMS 8/60

20 pcs Blue M   1180 3/5 yds c .65 | 768 | 10

---

SERIES S  N° 2224    New York Nov. 1st 1901.

Messrs John S.... & Co.
1000 Broad St. Philadelphia Pa.

This Bill is payable to the C. D. BANK
1000 Broad St. NewYork N.Y.
Make checks payable to order of
C. D. BANK and mail direct.

*B*

BOUGHT OF A. B. WOOLEN CO.
MANUFACTURERS & MERCHANTS,
*A*
4000 BROADWAY.

VIA Penn R.R.    TERMS 8/60.

20 pcs Blue M   1180 3/5 yds c .65 | 768 | 10

WITNESSES: Fig. 1.  INVENTOR
Gustave Dieterich.   Frank E. Anderson
John Kehlenbeck.   BY Joseph A. Stetson
   his ATTORNEY No. 704,168.                                              Patented July 8, 1902.
F. E. ANDERSON.
MEANS FOR CASHING SALES ACCOUNTS.
(Application filed Nov. 29, 1901.)

(No Model.)                                               4 Sheets—Sheet 2.

Know all Men by these Presents, That we A.B. WOOLEN CO. for value received (upon the same being paid to the credit of our account with the C.D. BANK of New York) have bargained, sold, assigned and transferred and by these presents do bargain, sell, assign and transfer unto the E.F. COMMERCIAL CO., its successors and assigns, the claim or account set forth in the statement on the reverse side hereof, and the right to collect and receive all moneys due and to grow due upon the same or sales therein set forth; and we hereby constitute and appoint said E.F. COMMERCIAL CO. our true and lawful attorney, irrevocably for us and in our name and stead, but to its own use and benefit, to sell, assign, transfer, set over, compromise or discharge the whole or any part of the aforesaid claim or account, and for that purpose to do all acts and things necessary or proper in the premises and one or more persons to substitute with like power, hereby ratifying and confirming all that our said attorney or its substitutes shall lawfully do by virtue thereof.

We hereby guarantee that this account so assigned is a bona fide sale and a correct account for goods actually sold and delivered and accepted, and that any claim or deductions allowed will be refunded by us by allowing the same to be deducted from future advances or by payment of the amount of such deductions in cash; and that any invoices or bills rendered by us for this account shall have stated upon their face that they are payable at the bank of deposit designated by the E.F. COMMERCIAL CO.

In Witness Whereof we have hereunto set our hands and seal this 1st day of Nov. 1901.

A.B. WOOLEN CO.
Per _Cumm Bumm_ Treas.

E.F. COMMERCIAL CO.
by _P..... M......_
Treasurer.

G.H. CREDIT INSURANCE CO.
EVIDENCE OF DEBT
and is guaranteed by the undersigned to be a genuine against the purchaser herein named.
No. _____ in the This is to certify that this claim is insured under the terms and conditions of policy

Fig. 3.

WITNESSES:
_Gustave Dieterich_
_John Ehlenbeck_

INVENTOR
_Frank E. Anderson_
BY _Joseph A. Stetson_
his ATTORNEY

APPLICATION FOR LOAN No. 400       NEW YORK, Nov. 1st 1901.

C.D. BANK

GENTLEMEN:
As per schedule below, please find herewith sales accounts, which it is proposed to assign and make payable to you, amounting to Gross $1768.10, Net $1606.65, upon which we ask for a loan of $1,526.32, to be placed to the credit of our account.

Respectfully,  E.F. COMMERCIAL Co.

By Ruum W.

| Name of Debtor | Due Date of Bill | Gross Amount | Net Amount |
|---|---|---|---|
| John S—— & Co. | Nov. 23 | 768 10 | 706 65 |
| Jno. H. Dunn & Co. | Dec. 23 | 1000 — | 900 — |
|  |  | 1768 10 | 1606 65 |
| Carried Forward, |  | 1768 10 | 1606 65 |

WITNESSES:                                    INVENTOR

Gustave Dieterich                Frank E. Anderson

Fig. 4.            BY

John Kehlenbeck                Joseph A. Stetson
                                            his ATTORNEY No. 704,168.  
F. E. ANDERSON.  
MEANS FOR CASHING SALES ACCOUNTS.  
(Application filed Nov. 29, 1901.)

(No Model.)  
Patented July 8, 1902.  
4 Sheets—Sheet 4.

*Know all men by these presents*, that we, the E. F. COMMERCIAL CO. doing business in New York City, New York, for value received, have bargained, sold, assigned and transferred, and by these presents do bargain, sell, assign and transfer, unto A. B. BANK the claims or accounts described or referred to in the statement on the reverse side hereof, for the aggregate sum of $1768.10, heretofore assigned to us as more fully appears by assignments endorsed on each of said accounts, and the right to collect and receive all moneys due, and to grow due, as provided in said assignments, to have and to hold the same unto said A. B. BANK its successor, successors or assigns, for its and their benefit, as and for collateral security for the payment of our certain obligation for $1526.32 dated Nov. 1st 1901, payable on demand. We hereby guarantee that said claims or accounts will be paid in full on the due dates thereof respectively, and that the same have been insured as per policy deposited with, and assigned to, said E. F. COMMERCIAL CO., as further security. And we hereby constitute and appoint said A. B. BANK our true and lawful attorney irrevocable, for us and in our name and stead, but to its own use and benefit, to collect, sell, assign, transfer and set over the whole or any part of the aforesaid claims or accounts, and all moneys due, and to grow due, thereon, and to enforce the provisions of said assignments to us, and for that purpose to do all acts and things necessary or proper in the premises, and one or more persons to substitute with like power, hereby ratifying and confirming all that our said attorney or its substitute or substitutes shall do by virtue thereof.

IN WITNESS WHEREOF, we have hereunto set our hand and seal this Nov. 1st 1901

E. F. COMMERCIAL CO.

Sealed and delivered in the presence of by _____ [SEAL]  
Secretary.

X. Y. Z.

WITNESSES:  
Gustave Dieterich  
John Kehlenbeck

Fig. 5.

INVENTOR  
Frank E. Anderson  
BY Joseph A. Stetson  
his ATTORNEY

UNITED STATES PATENT OFFICE.

FRANK E. ANDERSON, OF NEW YORK, N. Y.

MEANS FOR CASHING SALES ACCOUNTS.

SPECIFICATION forming part of Letters Patent No. 704,168, dated July 8, 1902.

Application filed November 29, 1901. Serial No. 83,974. (No specimens.)

*To all whom it may concern:*

Be it known that I, FRANK E. ANDERSON, a citizen of the United States, residing at New York city, New York, have invented new and useful Improvements in the Means for Cashing Sales Accounts, of which the following is a specification.

My invention relates to a novel art or method of cashing sales accounts of merchants and the provision of means for practicing the same, comprising a new bankable collateral security.

The object of my invention is to enable a person or concern to cash sales accounts of merchants—that is, to provide the sellers of goods with ready money or credits payable on demand, against which checks may be drawn before the debts contracted by the sales of goods become due. The concern practicing my invention makes use of a series of commercial documents which constitute a novel collateral security adapted to be received by banks and trust companies as the basis for loans which supply the money or credits by which the sales are cashed.

I believe that my invention, besides being of value to those engaged in the business of cashing sales, is a benefit to the public, inasmuch as it creates a new collateral security and enables an extension of credits along conservative lines.

An understanding of my invention will best be gained by reference to the accompanying drawings, in which—

Figure 1 represents a bill of sale of goods sold and delivered bearing on its face a notice or statement that the same is payable to the order of a concern other than the seller of the goods, which concern will be hereinafter designated, for convenience, the "bank." Fig. 2 represents a duplicate of the bill of sale shown in Fig. 1, but without the notice or statement above referred to. Fig. 3 represents the reverse side of the duplicate bill of sale shown in Fig. 2 and exhibits the obligation to be signed by the merchant or seller of goods consisting of, first, an assignment of the account to the concern practicing my invention, termed hereinafter the "commercial company," or its assigns; second, a guaranty as to the *bona fide* character of the sale and as to any allowances thereon which may be made to the purchaser and that the bill rendered the purchaser shall have the statement or notice shown in Fig. 1. It also exhibits a certificate that the account is insured by a policy in a company hereinafter termed, for convenience, the "insurance company." Fig. 4 represents an application by the commercial company to the bank for a loan, with a schedule of the sales accounts embraced in the application and in the assignment and obligation on the reverse side thereof. Fig. 5 represents the reverse side of the application shown in Fig. 4 and shows the obligation to be signed by the commercial company consisting of, first, an assignment of the sales accounts scheduled on the reverse side, (shown in Fig. 4;) second, a guaranty of the accounts and that the same have been insured, &c.

Referring to the drawings, A, Fig. 1, is a bill of sale in ordinary form with the notice B attached thereto or printed thereon.

C, Fig. 2, is a duplicate of A, but without the notice B.

D, Fig. 3, is the reverse side of C and bears the obligation E to be signed by the merchant or seller of the goods, which consists of the assignment $e$ and the guaranty $e'$. D also bears the certificate and guaranty F to be signed by the commercial company.

G, Fig. 4, is the application to the bank for the loan. It bears the application proper, H, to be signed by the commercial company and the schedule of sales accounts I, as shown.

J, Fig. 5, represents an obligation to be signed by the commercial company, consisting of an assignment K of the accounts enumerated in the schedule and a guaranty L of said accounts and that the same have been insured.

In practicing my invention the commercial company makes use of the above-described documents in the following manner: The merchant who is the customer of the commercial company is provided with the bills of sale A, containing the notice B, designating that the account is payable to the designated bank, which is the institution with which it is intended to place the collateral security as the basis for the loan. The merchant is also provided with duplicate bills of sale C with the assignment $e$ and guaranty $e'$. The blank certificate and guaranty F may or may not be on the bill of sale C when in the hands of the merchant. It is intended to be executed by the commercial company after the duplicate bills of sale C have been delivered by the merchant to the commercial company. The merchant fills out the original bill of sale A with the notice B thereon to accord with the terms of the sale, and the same is forwarded (preferably by the bank) to the purchaser of the goods whose debt is to be cashed. The duplicate bill of sale C is also filled out by the merchant who signs the obligation E, thus assigning the sales account to the commercial company, guaranteeing the *bona fide* character and correctness of the account and providing against claims or deductions by the purchaser of the goods and that the bill of sale rendered the purchaser shall have the notice B. The duplicate bill of sale C having been filled out and executed by the merchant, as indicated, is delivered to the commercial company.

Where sales are cashed after a bill of sale has been sent the purchaser by the merchant without the notice B a confirmatory statement of the account is sent the purchaser by the merchant, the commercial company, or the bank containing the notice B to effect that the account is payable to the order of the bank. Such a confirmatory statement may be sent the purchaser, of course, even though the original bill displayed the notice B; but in such case the additional statement is mere repetition or surplusage. Each sales account cashed by my method may be insured by a concern carrying on the now well-recognized business of insuring credits. Usually the accounts will be insured by the commercial company; but they may be insured by the merchant. Naturally the compensation of the commercial company for cashing the sales account will be larger in instances where the commercial company pays the premium for the insurance than in cases where the merchant takes out the insurance and pays the premium. Each sales account may be separately insured; but it is more usual for the merchant or the commercial company to have the accounts covered by a blanket policy. The commercial company having received the duplicate bill of sale insures the account with the insurance company unless the same is already covered by a blanket policy or has been insured by the merchant. The commercial company then executes the certificate and guaranty F, lists the several sales accounts upon which a loan is desired on the schedule I, signs the application H, as indicated, and executes the obligation J, thus assigning to the bank the accounts enumerated and guaranteeing the accounts and that the same have been insured. The loan secured by this collateral may be made by the bank upon a note of the commercial company or otherwise. In practice a note is not required, the transactions being numerous and being in the nature of an open account.

The statement B on the original bill of sale A is notice to the purchaser of goods or debtor that the account is payable to the bank, which receives the payment when due and made and credits the commercial company with the amount thereof. The commercial company avails itself of the loan from the bank to cash the sales accounts negotiated, as above indicated—*i. e.*, to pay the merchant the amount of the sales accounts less commissions for its services. In practice a merchant whose sales accounts are customarily cashed will have an account with the bank accepting the collateral security above set forth, and a credit will simply be transferred to the merchant's account at the instance of the commercial company from the amount of the loan made to said company upon said security.

In simplest form my invention may be practiced without availing of credit insurance and directly between the bank, merchant, (or seller of goods,) and the purchaser of goods or debtor without the intervention of an intermediary, hereinbefore termed the "commercial company." The merchant will in this case be provided with the original and duplicate bills of sale A and C, the notice B being on A. The merchant will sign the obligation E, thus assigning the claim by the assignment $e$ and guaranteeing the important facts regarding the sale and the notice B, as indicated at $e'$, Fig. 3. The further guaranty of the commercial company and the insurance of the sales account lends greater credit to the security, according to the responsibility of the commercial company and the insurance company.

I do not abandon the art, method, or process of cashing sales accounts or any part thereof here described and not claimed, but claim the same in a divisional application filed by me on March 28, 1902, Serial No. 100,389.

What I claim as new, and desire to secure by Letters Patent, is—

1. The hereinbefore-described means adapted to be used in cashing sales accounts consisting of the combination of a bill for goods sold and delivered, a duplicate bill and an obligation of the seller of the goods on said duplicate bill consisting of an assignment of the debt, a guaranty of the *bona fides* of the sale, of the correctness of the account and that the seller will make good any claims or allowances or failure of payment and a statement on the original bill of sale that said bill is payable to a determined assignee.

2. The combination of a series of documents which together form a chain of bankable collateral, consisting of an original bill for goods sold and delivered made out to the buyer, which said original bill bears upon its face the statement that it is payable by check to the order of a certain bank; a duplicate of said bill, which duplicate contains an assignment of said account, together with a guaranty by the seller of the *bona fides* of the sale, of the correctness of the account, of the delivery and acceptance of the goods, and a further guaranty that the seller will make good any claims or deductions, or allowances made by the buyer from the amount of said bill, or his failure to pay the same when due; a certificate upon said duplicate sales account that the sale is insured under the terms of a specific policy of credit insurance referring thereto; a second assignment by the first assignee of said account to the bank to which the original bill is on its face made payable, which said second assignment contains a further guaranty by the first assignee that said sales account will be paid when due, said series of documents constituting a chain of guaranteed collateral upon which a loan is made by said bank.

3. The herein-described collateral security consisting of the combination of a bill of sale displaying a notice that the same is payable to a lender of money; a duplicate bill of sale containing an assignment of the account to an intermediary; a reassignment of the account and a guaranty of payment in full to the aforesaid lender of money.

4. The herein-described collateral security consisting of the combination of a bill of sale displaying a notice that the same is payable to a lender of money; a duplicate bill of sale containing an assignment of the account to an intermediary; a reassignment of the account with a certificate that the account is covered by insurance and a guaranty of payment in full to the aforesaid lender of money.

5. The hereinbefore-described means adapted to be used in cashing sales accounts consisting of the combination of an original and a duplicate bill of sale, the original displaying a notice that the account is payable to the concern which shall advance money thereon, the duplicate containing an assignment of the claim and a guaranty of its *bona fide* character and that the seller will settle allowances and claims made by the purchaser of the goods.

6. The hereinbefore-described means adapted to be used in cashing sales accounts consisting of the combination of an original and a duplicate bill of sale, the original displaying a notice that the account is payable to the concern which shall advance money thereon, the duplicate containing an assignment of the claim.

7. The hereinbefore-described means adapted to be used in cashing sales accounts consisting of the combination of an original and a duplicate bill of sale, the original displaying a notice that the account is payable to the concern which shall advance money thereon, the duplicate containing an assignment of the claim, a guaranty of its *bona fide* character and that the seller will settle allowances and claims made by the purchaser of the goods, and a certificate that the sales account is insured.

8. The hereinbefore-described means adapted to be used in cashing sales accounts consisting of the combination of an original and a duplicate bill of sale the original displaying a notice that the account is payable to the concern which shall advance money thereon, the duplicate containing an assignment of the claim and a certificate that the sales account is insured.

In testimony whereof I, FRANK E. ANDERSON, have signed my name to this specification, in the presence of two subscribing witnesses, this 25th day of November, 1901.

FRANK E. ANDERSON.

Witnesses:
   GEORGE D. MUMFORD,
   JOSEPH A. STETSON.